United States Patent [19]

Neville

[11] 3,911,287

[45] Oct. 7, 1975

[54] WAVE DRIVEN POWER GENERATORS

[76] Inventor: Robert Lee Neville, 1180 Hallinan, Lake Oswego, Oreg. 97034

[22] Filed: Mar. 13, 1974

[21] Appl. No.: 450,736

[52] U.S. Cl. .................................................. 290/53
[51] Int. Cl.² ......................................... F03B 13/12
[58] Field of Search ..................... 290/42, 43, 53, 54

[56] References Cited
UNITED STATES PATENTS

| | | | |
|---|---|---|---|
| 628,457 | 7/1899 | Gehre | 290/42 |
| 2,179,537 | 11/1939 | Zoppa | 290/42 |

*Primary Examiner*—Robert K. Schaefer
*Assistant Examiner*—W. E. Duncanson
*Attorney, Agent, or Firm*—Klarquist, Sparkman, Campbell, Leigh, Hall & Whinston

[57] ABSTRACT

Two one-way clutches on a power output shaft are driven through two oppositely driven power trains driven by a lever arm oscillated by a float raised by waves and lowered by gravity. In an alternate embodiment, a plurality of float-oscillated lever arms are spaced apart a fraction of a wave length and drive pairs of one-way clutches on a power output shaft which drives a positive displacement pump. Another embodiment includes a paddle wheel carried by a lever arm oscillated by a float raised and lowered relatively rapidly by waves and relatively slowly by tide, a power output shaft driven unidirectionally by oppositely driven power trains through two one-way clutches, and a current driven paddle wheel carried by the arm and driving the shaft through two additional one-way clutches.

5 Claims, 3 Drawing Figures

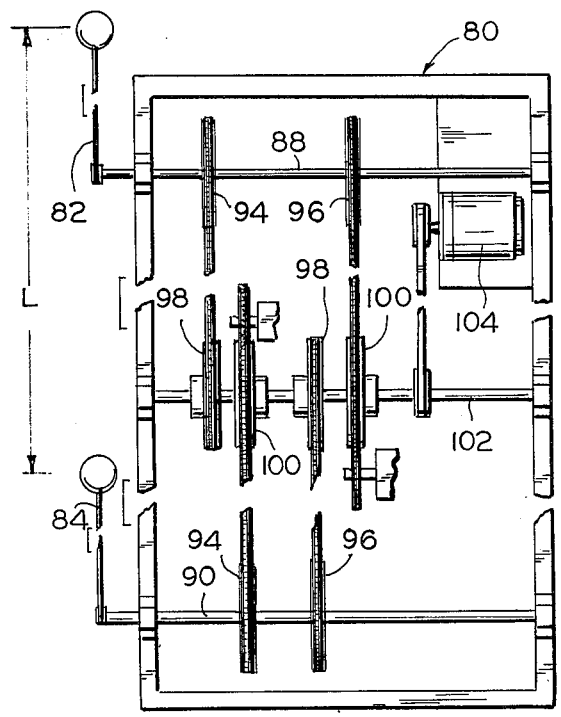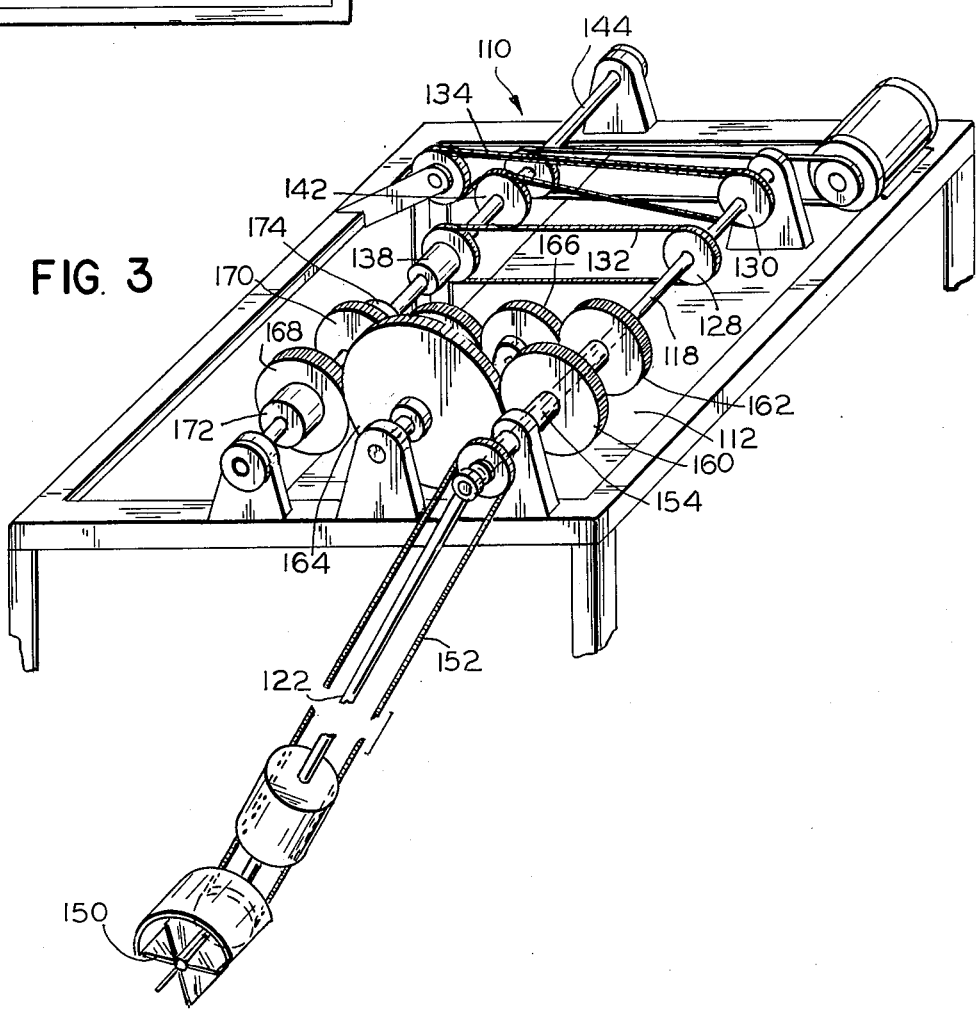

3,911,287

WAVE DRIVEN POWER GENERATORS

DESCRIPTION

This invention relates to wave driven power generators, and has for an object thereof the provision of new and improved wave driven power generators.

Another object of the invention is to provide a wave driven power generator in which a bidirectional power input is converted to a unidirectional power output.

A further object of the invention is to provide a wave driven power generator in which a pair of power trains driven in opposite directions drive two one-way clutches to produce a single direction power output.

Another object of the invention is to provide a wave driven power generator in which an output shaft is driven by a plurality of pairs of one-way clutches driven by pairs of drive trains driven by a plurality of float driven oscillating shafts.

Another object of the invention is to provide a wave driven power generator in which a float is mounted on a driving arm of sufficient length to cause oscillation of the arm throughout variation in wave height and tidal variation in water height.

Another object of the invention is to provide a wave driven power generator in which an output is smoothed by a flywheel.

Another object of the invention is to provide a power generator in which a paddle wheel is mounted with a float on a lever arm.

IN THE DRAWINGS:

FIG. 2 is a top plan view of a wave driven power generator forming an alternate embodiment of the invention, and, FIG. 3 is a perspective view of a power generator forming an alternate embodiment of the invention.

Figure 1:
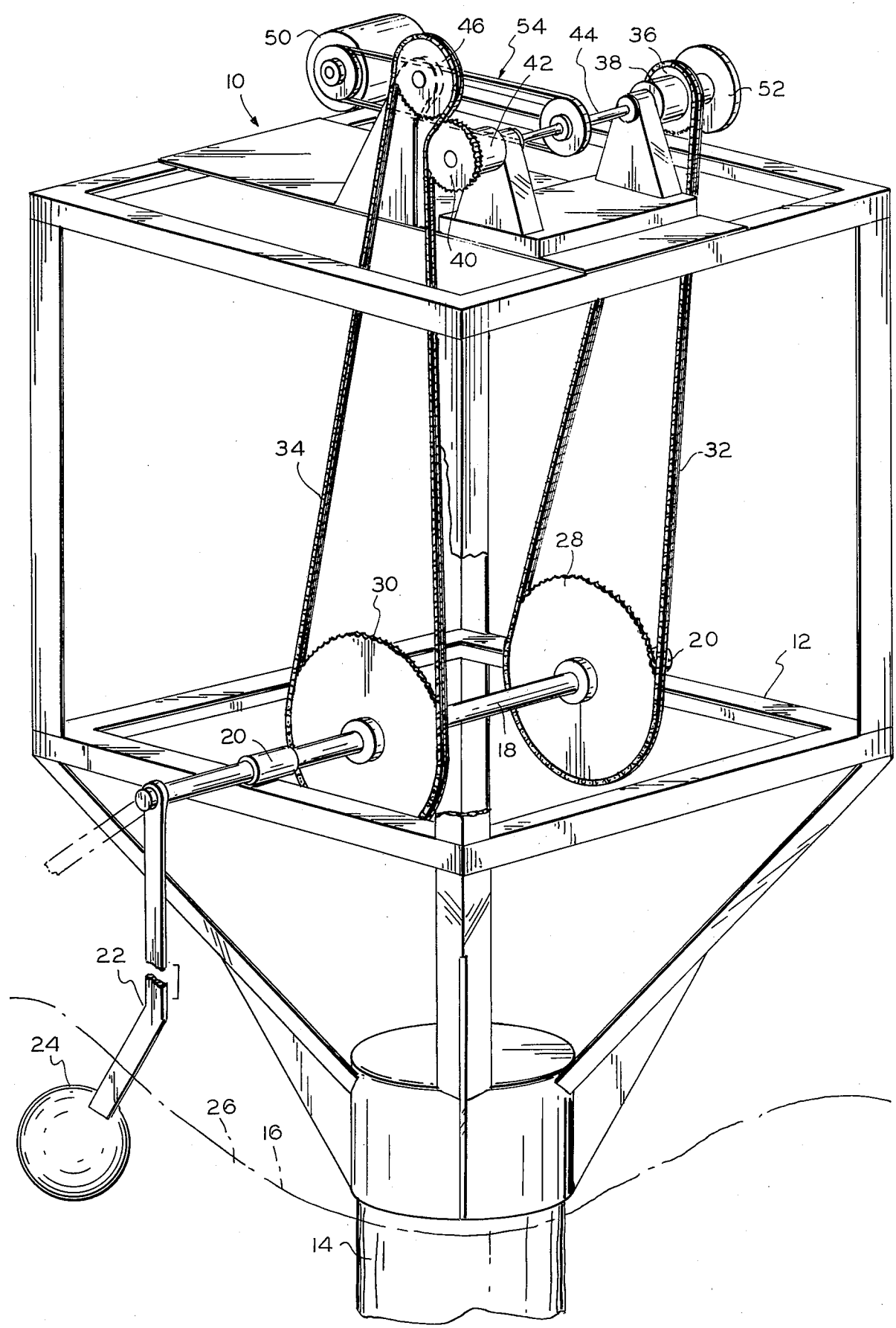
FIG. 1 is a perspective view of a wave driven power generator forming one embodiment of the invention.

Referring now in detail to the drawings, a wave driven power generator 10 (FIG. 1) forming one embodiment of the invention includes a platform 12 supported by legs or piles 14 embedded in the bottom of an ocean or lake 16. A driving shaft 18 journaled in bearings 20 carried by the platform is oscillated by a driving arm 22 keyed thereto and carrying a float 24 at its outer end. The float is raised by waves 26 and is lowered by gravity to oscillate the shaft 18. The shaft oscillates two sprockets 28 and 30 to reversibly drive chains 32 and 34 both in the same direction at any time. The inside of the chain 32 engages and oscillates a sprocket 36 of a one-way clutch 38, and the outside of the chain 34 engages and oscillates a sprocket 40 of a one-way clutch 42 in the same direction at any instant as the drive of the sprocket 36. The clutches both drive in the same direction and overrun output shaft 44 in the same direction and preferably are of the clevis type. An idler sprocket 46 is provided for the chain 34 to keep the chain 34 in engagement with the sprocket 40.

The unidirectionally driven output shaft 44 can be used to drive any desired load, for example, an alternator 50, and a flywheel 52 and a governor (not shown) may be mounted on the alternator shaft or, if desired, directly on the output shaft. A power train 54 between the output shaft and the alternator may be a belt and pulleys.

The arm 22 is sufficiently long that it can operate in the lower lefthand quadrant only regardless of variation in wave height and tidal variation, the arm preferably extending in the direction of predominant wave movement. This enables the platform 12, shaft 18, etc. to be up out of the water.

EMBODIMENT OF FIG. 2

In a wave driven power generator 80 forming an alternate embodiment of the invention, a plurality of float driven arms 82, 84 and 86 like the arm 22, are spaced apart equal fractions of the predominant wave length L between crests of the waves. Each arm oscillates one of the shafts 88, 90 and 92 to drive pairs of power trains 94 and 96 coupled by pairs of one-way clutches 98 and 100 on output shaft 102. This keeps the speed of rotation of the shaft 102 more nearly constant. In this embodiment, the output shaft drives a positive displacement pump 104, which may pump water up to an elevated height for storage of energy.

EMBODIMENT OF FIG. 3

A wave and current driven power generator 110 forming an alternate embodiment of the invention includes a lever arm 122 like the arm 22 and whose outer end is raised and lowered by waves and tide. The oscillation of the lever arm 122 oscillates an inner shaft 118 to oscillate two sprockets 128 and 130 to reversibly drive chains 132 and 134 simultaneously in the same direction, and the chains oscillate sprockets 136 and 140 of one-way clutches 138 and 142 to unidirectionally drive output shaft 144, just like the output shaft 44 of the generator 10 (FIG. 1) is driven. In addition, to generate further power to the shaft, a paddle wheel 150 carried by the outer end of the arm is driven by current (as by tide) to drive through a chain and sprocket drive 152 an outer, tubular shaft 154 journaled on platform 112 and journaling the shaft 118. The outer shaft 154 is turned in one direction when the tide or current runs in one direction and is turned in the opposite direction when the current flow runs in the other direction. The outer shaft turns two sprockets 160 and 162 to drive chains 164 and 166 to drive sprockets 168 and 170 of one-way clutches 172 and 174 to drive the output shaft 144 in the same direction as the drive thereof by clutches 138 and 142. The gear ratio from the paddle wheel to the output shaft is stepped down relative to that from the lever arm and inner shaft to the output shaft by such an amount that the paddle wheel tends to drive the output shaft at about the average speed of the output shaft.

What is claimed is:

1. In combination,
   an output shaft means,
   a first one-way clutch coupled to the shaft means for driving the shaft means in one direction,
   a second one-way clutch coupled to the shaft means for driving the shaft means in said one direction,
   bidirectionally moving power means including a float and a reversible power train driven by the float,
   the reversible power train including drive shaft means and a lever keyed at one end to the drive shaft means and connected to the float at the other end thereof,
   and a pair of oppositely driving coupler means driven by the power means for driving the one-way clutches in opposite directions.

2. The combination of claim 1 including tower means mounting the drive shaft means above the level of a tidal body of water having waves, the length of the lever being greater than at least one-half of the difference between the tidal level extremes.

3. The combination of claim 2 wherein the length of the lever is greater than said difference between the tidal level extremes.

4. In combination,
an output shaft means,
a first one-way clutch coupled to the shaft means for driving the shaft means in one direction,
a second one-way clutch coupled to the shaft means for driving the shaft means in said one direction,
bidirectionally moving power means including a float and a reversible power train driven by the float,
a pair of oppositely driving coupler means driven by the power means for driving the one-way clutches in opposite directions,
paddle wheel means carried by the float in a position to be reversibly driven by reversing current,
third and fourth one-way clutches coupled to the shaft means for rotating the shaft means in said direction,
and a second pair of oppositely driving coupler means driven by the paddle wheel means and driving the third and fourth one-way clutches in opposite directions.

5. The combination of claim 4 including an inner drive shaft connected to the first-mentioned oppositely driving coupler means,
an outer drive shaft connected to the second pair of oppositely driving coupler means and coaxial with the inner drive shaft, a lever keyed at one end thereof to the inner drive shaft and connected to the float and the paddle wheel means at the other end thereof, and means coupling the paddle wheel means to the outer drive shaft.

* * * * *